Patented July 4, 1950

2,513,807

UNITED STATES PATENT OFFICE 2,513,807

MANUFACTURE OF CARBOXYALKYL CELLULOSE

Bayard T. Lamborn, Matawan, N. J., assignor to Hercules Powder Company, Wilmington, Del., a corporation of Delaware No Drawing. Application June 4, 1948,
Serial No. 31,213

13 Claims. (Cl. 260—232)

1

This invention relates to a process for the preparation of carboxyalkylcellulose and, more particularly, to a process for recovering the free acid form of carboxyalkylcellulose in a purified state from a crude etherification reaction mixture.

Prior art methods for recovering carboxyalkylcellulose derivatives in a pure state, free from by-product salts and residual reactants, have involved extracting the crude etherification reaction mixture containing a water- or alkali-soluble salt of carboxyalkylcellulose, by-product salts, excess reactants, and water with an organic solvent such as a lower aliphatic alcohol containing some water, insufficient in amount to cause dispersion of the carboxyalkylcellulose derivative but sufficient to have solvent action on the by-product salts and other wate-soluble contaminants. A solvent composed of 70% methanol and 30% water is typical of aqueous organic solvent mixtures employed for this purpose.

Prior art methods of this type are subject to a number of disadvantages. In the first place, they are slow and costly, particularly when the carboxyalkylation is carried out by the dough or kneader process in which the carboxyalkylcellulose derivative is formed as a compact, dense dough or gel which is not easily penetrated by the aqueous organic wash liquor. In the second place, purification is often incomplete, even under very favorable conditions, so that the final product is contaminated with by-product salts. In the third place, the economic necessity for recovery of solvent increases the costs of operation. In the fourth place, the carboxyalkylcellulose is obtained in the form of a salt, such as sodium carboxymethylcellulose, and, in order to obtain other desirable salts of carboxyalkylcellulose, it is necesary, first, to treat the purified salt in suspension in an organic solvent with a strong acid to liberate the acid form and then wash the acid form free of salt by extracting with aqueous solvent as in the original purification process for the salt.

It is known that the free acid form of carboxyalkylcellulose which is insoluble in water can be obtained by treating the crude etherification reaction mixture with a large excess of a strong mineral acid. This is wasteful, however, for the large excess of acid required becomes contaminated during the treating process and is not economically recoverable.

Now in accordance with the present invention the free acid form of carboxyalkylcellulose in a purified state is recovered from a crude etherification reaction mixture containing a salt of carboxyalkylcellulose, by-product salts, excess reactants, and water by a process which involves adjusting the pH of the crude etherification reaction mixture to a value less than about 7; drying to a moisture content less than about 5% by weight; treating with water, the pH of which has been adjusted to a value less than about 3.0, for a time sufficiently long to render the carboxyalkylcellulose insoluble in water; and thereafter washing with water until free of contaminating salts. By this process, the carboxyalkylcellulose is purified by washing with water and the free acid form recovered without the necessity for a costly extraction process with an aqueous organic solvent or use of a large excess of mineral acid to convert the salt of carboxyalkylcellulose into the water-insoluble free acid form.

The purified free acid form of carboxyalkylcellulose prepared in accordance with this invention is readily and conveniently converted into any desired salt thereof, such as the lithium, sodium, potassium, ammonium, magnesium, etc., salts, by treating the free acid form of carboxyalkylcellulose with the hydroxide or the carbonate of the desired metallic derivative, such as sodium hydroxide, potassium carbonate, ammonia, etc.

Having described the invention in a general way, the following examples are given to illustrate specific embodiments thereof.

Example 1

A crude etherification reaction mixture dough resulting from the carboxymethylation of alkali cellulose with sodium chloroacetate in a Werner-Pfleiderer mixer and containing approximately 20% by weight of sodium carboxymethylcellulose having a substitution of 0.7 carboxymethyl group per anhydroglucose unit, 33% salts and residual reactants, and 47% water was neutralized with sodium bisulfate to a pH of 6.5. The neutralized crude dough was then extruded through orifices in a press to form continuous cohesive strands having a diameter of about 0.038 inch. These strands were then dried in warm air at 94° C. for 4 hours to a moisture content of 3.5% and then immersed for 2 hours in water adjusted to a pH of 1 with hydrochloric acid and maintained at a pH of 1 by adding additional hydrochloric acid as required. The strands became soft but did not disperse or disintegrate and, after removal from the acidified water, were washed with water until free of contaminating salts. The washed product was dried and granulated.

Example 2

The procedure of Example 1 was followed except that the strands were dried 8 hours, instead of 4 hours, at 94° C. to a moisture content of 2.58% by weight. The additional drying made these strands tougher than the strands in Example 1 and, therefore, more resistant to disintegration by handling during the acidified wash and subsequent water washing.

Example 3

The procedure of Example 1 was followed except that the strands were dried 12 hours, instead of 4 hours, at 94° C. to a moisture content of 2.22% by weight. The additional drying made these strands even tougher than the strands in Example 2 and, therefore, even more resistant to disintegration by handling during the acidified wash and subsequent water washing.

Example 4

The procedure of Example 1 was followed except that the extruded strands were not dried but were immersed directly in water adjusted to a pH of 1 with hydrochloric acid and maintained at a pH of 1 by adding additional hydrochloric acid as required. The extruded strands slowly disintegrated, making further purification treatment by washing with water impossible.

This example illustrates the importance of drying the neutralized extruded strands of crude etherification reaction mixture dough to a low moisture content, as was done in Examples 1, 2 and 3, before immersing the strands in water adjusted to a pH of 1.

Example 5

A crude etherification reaction mixture dough similar to that in Example 1 was neutralized with sodium bisulfate to a pH of 6.5 and then extruded and dried as in Example 3. The dried strands were then immersed directly into water without previous adjustment of the pH of the water. They swelled to about tenfold in volume and distintegrated upon further handling so that further purification by washing with water was made impossible.

This example illustrates the importance of treating the dried crude reaction mixture with an acidified water wash as in Examples 1, 2 and 3 before further purification by washing with water is possible.

Example 6

A crude etherification reaction mixture dough having a pH of approximately 9 was extruded as in Example 1 without previous adjustment of pH. The extruded strands were dried 48 hours at 100° C. and were then immersed in water adjusted to a pH of 1 with hydrochloric acid and maintained at a pH of 1 by adding additional hydrochloric acid as required. After one-half hour the strands gelled and became adhesive, thus making further purification by washing with water impossible.

This example illustrates the importance of adjusting the pH of the crude reaction mixture to a value less than 7, as in Examples 1, 2 and 3, before proceeding to the subsequent steps in the purification process.

Example 7

Purified carboxymethylcellulose having a substitution of approximately 0.7 carboxymethyl group per anhydroglucose unit was prepared in accordance with Example 3 and, after washing with water until free of contaminating salts and while still wet with wash water, was suspended in methanol and the pH adjusted to 7.5 with sodium hydroxide. The sodium salt of carboxymethylcellulose formed was drained and dried at 50° C. It dissolved easily in water.

Example 8

0.015-inch diameter strands of purified carboxymethylcellulose having a substitution of 0.7 carboxymethyl group per anhydroglucose unit were prepared in accordance with Example 3, dried to a moisture content of approximately 10% by weight, and exposed to an atmosphere of ammonia vapor for 4 hours. The ammonium salt of carboxymethylcellulose formed by this treatment dissolved easily in water.

The crude etherification reaction mixture which may be treated in accordance with the process of the present invention may be in the form of a paste or dough resulting from the carboxyalkylation of an alkali cellulose in a kneading device such as a dough mixer of the Werner-Pfleiderer type, or it may be a fibrous mass derived from the carboxyalkylation of a suspension or slurry of fibrous alkali cellulose in a nonsolvent organic liquid. In either case, the crude etherification mixture normally has a pH of about 9 or higher which must be adjusted within the acid range in order to obtain the improved results. The reason for this is not clearly understood. However, such pH adjustment has been found necessary, as illustrated by a comparison of the results of Examples 1, 2 and 3 with those of Example 6.

The first step in accordance with this invention involves adjusting the pH of the crude etherification reaction mixture to a value less than about 7 and, preferably, to a value between about 4.0 and 6.5. This may be accomplished with a strong mineral acid such as hydrochloric, sulfuric, or nitric acid, or with an acid salt such as sodium acid sulfate.

Following the pH adjustment, the crude etherification reaction mixture, if in the form of a paste or dough, is then reduced to shaped articles such as thin sheets, ribbons, strands, threads, rods, tubes, or small granules in order to create large surface and uniformity of product thickness so that subsequent washing treatment will be uniformly effective on every increment making up the batch of crude dough. This may be done conveniently by extruding the dough through orifices, as, for instance, by means of a smokeless powder press or a spaghetti press, into thin, continuous, cohesive threads, strands, rods, or tubes. Alternatively, the mass may be rolled into a sheet or ribbon which may be slitted if desired into threads or strands. The sheets, ribbons, threads, strands, rods, or tubes may, if desired, be reduced to short lengths, particles, or granules by any suitable cutting, slicing, or granulation means. The crude reaction mass may be granulated directly, if desired.

Generally, it has been found that at least one dimension of such shaped articles should be less than about 0.04 inch. Thus, sheets, ribbons, threads, strands, and rods should be less than about 0.04 inch thick. Hollow tubes may be as much as about 0.5-inch diameter but the wall thickness of the tube should be less than about 0.04 inch. Granules should likewise be less than about 0.04 inch in at least one dimension.

The crude etherification reaction mixture is then dried to a mosture content less than about 5% and, preferably, less than about 3.5%. When the crude etherification reaction mixture contains more than about 5% by weight of moisture, it becomes extremely soft in subsequent purification treatment and tends to swell and disintegrate so that further washing treatment with water becomes impossible. The product becomes progressively tougher as the moisture content is lowered below about 5% and, therefore, progressively more resistant to disintegration during subsequent washing treatment. Material having from 2 to 3.5% by weight of moisture is quite resistant to swelling and disintegration and can be handled without undue care during subsequent washing treatments.

Drying of the product may be effected at any suitable temperature. However, from a practical standpoint, drying is usually carried out at elevated temperatures. A convenient and practical temperature range for accomplishing the drying is from about 90° to 100° C., although higher or lower temperatures may be used if desired.

The time of drying may be varied from about 2.5 to about 12 hours but will usually require at least about 3 hours. A longer drying period is usually preferred in order to insure a sufficiently low moisture content and a tough, resistant product which can be handled without undue care during subsequent washing treatments. In any case, the drying treatment should be of sufficient duration to insure that the product will not swell and disperse when immersed in water adjusted to a pH of about 3.0 or lower. This is easily established by taking samples periodically from the drying step and immersing them in water at a pH of about 3.0 or less and observing their behavior. Drying may be terminated as soon as the dried product can be handled in the acidified water bath without disintegration.

When the crude etherification reaction mixture is in fibrous form, no special treatment to increase surface area is required, since the individual fibers are already uniformly small in size. In such cases, the pH of the slurry is adjusted as before, the liquid drained off, and the fibrous material dried in any suitable manner such as that used in connection with the dough form.

The step of drying the pH-adjusted crude etherification reaction mixture to a water content less than about 5% in accordance with this invention is quite important, as will be evident by comparing the results of Examples 1, 2, and 3 where the product was dried to 3.5% or less of water with those of Example 4 where the crude mixture was not dried.

After drying, the crude etherification reaction mixture is treated with water adjusted to a pH of less than about 3.0 for a period of time sufficient to render the carboxyalkylcellulose insoluble in water. Preferably, the pH is adjusted to a value between about 1 and about 1.5. This treatment is ordinarily accomplished by immersing the dried product from the previous step in an acidified water bath adjusted to a pH value less than about 3 and maintained within this pH range. The product is allowed to soak in this bath until the carboxyalkylcellulose is rendered insoluble in water. This may require from about 1 to about 4 hours but will usually require about 2 hours. This can be readily ascertained by periodically removing samples of the immersed product, placing them in water, and observing their behavior. The acidified water treatment is terminated as soon as the carboxyalkylcellulose becomes insoluble in water as noted by absence of a tendency to swell and disperse in the water.

The purpose of this step is to fully and completely liberate the free acid form of carboxyalkylcellulose and to favor coagulation of the free acid form into coherent water-insoluble gel of carboxyalkylcellulose. pH values above about 3.0 do not have sufficient coagulating power. pH values much less than about 1 are operative in accordance with this invention but are not required and result in an unnecessary waste of acid. The pH is preferably adjusted with a strong mineral acid such as hydrochloric, sulfuric, or nitric acids.

The step of treating the pH-adjusted and dried crude etherification reaction mixture with water adjusted to a pH of less than about 3.0 is also important as will be evident by comparing the results of Examples 1, 2, and 3 where this treatment was employed with the results of Example 5 where this step was eliminated.

Following the acidified water treatment, the carboxyalkylcellulose is washed with water until free of contaminating salts. This may be accomplished by displacement washing, spray washing, or by any other means whereby fresh water is brought into contact with the carboxyalkylcellulose during the washing treatment. The temperature of the wash water is not important, though normally it will not be heated. The wash water should have a pH value less than about 7.5 and, preferably, between about 6 and about 7. Most industrial plant waters ordinarily fall within this range of pH value and, hence, will require no previous adjustment of pH for this part of the process.

The purified free acid form of carboxyalkylcellulose may be dried and is then in condition for use at any future time. However, it may be readily and easily converted into a salt following the water washing treatment. For example, carboxyalkylcellulose free of contaminating salts and still wet with water is suspended in methanol and the pH adjusted to 7.5 with sodium hydroxide. This forms the sodium salt which is drained and dried and is ready for use.

The ammonium salt of carboxyalkylcellulose may be formed by drying the water-washed carboxyalkylcellulose to a water content of approximately 10% by weight and exposing it to an atmosphere of ammonia vapor. Other salts such as the potassium, lithium, and magnesium salts of carboxyalkylcellulose may be formed by treating the free acid form of carboxyalkylcellulose with the appropriate hydroxide or carbonate of the desired metal.

The process in accordance with this invention may be used to purify carboxyalkylcellulose having a substitution of from about 0.1 to about 2.0 carboxyalkyl groups per anhydroglucose unit. It is especially useful for purifying carboxyalkylcelluloses whose alkali salts are water-soluble and the degree of substitution of which falls between about 0.5 and about 2.0 carboxyalkyl groups per anhydroglucose unit.

Suitable carboxyalkylcelluloses which can be purified in accordance with this invention include carboxymethylcellulose, carboxyethylcellulose, and carboxypropyl cellulose.

The process as described is adaptable to a continuous operation wherein the crude etherification reaction mixture is continuously adjusted for pH and then successively dried, treated with water adjusted to a pH of less than about 3.0, and finally washed with water until free of contaminating salts.

One of the outstanding advantages of the present invention is that it permits washing carboxyalkylcellulose with water, thus eliminating the necessity for using a laborious and costly extraction process of purification with an aqueous organic solvent. It also permits a substantial saving in strong mineral acid in converting carboxyalkylcellulose into the free acid form. Another advantage is that it provides a method for isolating the free acid form of carboxyalkylcellulose in a purified state directly from the crude etherification reaction mixture. The purified free acid form of carboxyalkylcellulose is particularly useful as a convenient material for the preparation of any desired salt of carboxyalkylcellulose.

What I claim and desire to protect by Letters Patent is:

1. A process for recovering the free acid form of carboxyalkylcellulose in a purified state which comprises adjusting the pH of a crude etherification reaction mixture containing a salt of carboxyalkylcellulose, by-product salts, residual reactants, and water to a value less than about 7; drying to a moisture content less than about 5% by weight; treating the dried crude reaction mixture with water adjusted to a pH of less than about 3.0 for a period of time sufficient to render the carboxyalkylcellulose insoluble in water; and thereafter washing the carboxyalkylcellulose with water until free of contaminating salts.

2. A process for recovering the free acid form of carboxymethylcellulose in a purified state which comprises adjusting the pH of a crude etherification reaction mixture containing a salt of carboxymethylcellulose, by-product salts, residual reactants, and water to a value less than about 7; drying to a moisture content less than about 5% by weight, treating the dried crude reaction mixture with water adjusted to a pH of less than about 3.0 for a period of time sufficient to render the carboxymethylcellulose insoluble in water; and thereafter washing the carboxymethylcellulose with water until free of contaminating salts.

3. A process for recovering the free acid form of carboxyethylcellulose in a purified state which comprises adjusting the pH of a crude etherification reaction mixture containing a salt of carboxyethylcellulose, by-product salts, residual reactants, and water to a value less than about 7; drying to a moisture content less than about 5% by weight; treating the dried crude reaction mixture with water adjusted to a pH of less than about 3.0 for a period of time sufficient to render the carboxyethylcellulose insoluble in water; and thereafter washing the carboxyethylcellulose with water until free of contaminating salts.

4. A process for recovering the free acid form of carboxypropylcellulose in a purified state which comprises adjusting the pH of a crude etherification reaction mixture containing a salt of carboxypropylcellulose, by-product salts, residual reactants, and water to a value less than about 7; drying to a moisture content less than about 5% by weight; treating the dried crude reaction mixture with water adjusted to a pH of less than about 3.0 for a period of time sufficient to render the carboxypropylcellulose insoluble in water; and thereafter washing the carboxypropylcellulose with water until free of contaminating salts.

5. A process for recovering the free acid form of carboxyalkylcellulose in a purified state which comprises adjusting the pH of a crude etherification reaction mixture containing a salt of carboxyalkylcellulose, by-product salts, residual reactants, and water to a value between about 4 and about 7; drying to a moisture content less than about 5% by weight; treating the dried crude reaction mixture with water adjusted to a pH of less than about 3.0 for a period of time sufficient to render the carboxyalkylcellulose insoluble in water; and thereafter washing the carboxyalkylcellulose with water until free of contaminating salts.

6. A process for recovering the free acid form of carboxyalkylcellulose in a purified state which comprises adjusting the pH of a crude etherification reaction mixture containing a salt of carboxyalkylcellulose, by-product salts, residual reactants, and water to a value less than about 7; drying to a moisture content less than about 3.5% by weight; treating the dried crude reaction mixture with water adjusted to a pH of less than about 3.0 for a period of time sufficient to render the carboxyalkylcellulose insoluble in water; and thereafter washing the carboxyalkylcellulose with water until free of contaminating salts.

7. A process for recovering the free acid form of carboxyalkylcellulose in a purified state which comprises adjusting the pH of a crude etherification reaction mixture containing a salt of carboxyalkylcellulose, by-product salts, residual reactants, and water to a value less than about 7; drying to a moisture content less than about 5% by weight; treating the dried crude reaction mixture with water adjusted to a pH between about 1 and about 1.5 for a period of time sufficient to render the carboxyalkylcellulose insoluble in water; and thereafter washing the carboxyalkylcellulose with water until free of contaminating salts.

8. In a process for recovering the free acid form of carboxyalkylcellulose in a purified state from a dough of crude etherification reaction mixture containing a salt of carboxyalkylcellulose, by-product salts, residual reactants, and water, the steps which comprise adjusting the pH of said dough to a value less than about 7; reducing said dough to shaped articles; drying the shaped articles to a moisture content less than about 5% by weight; treating with water, the pH of which has been adjusted to a value less than about 3.0, for a time sufficiently long to render the carboxyalkylcellulose insoluble in water; and thereafter washing with water until free of contaminating salts.

9. In a process for recovering the free acid form of carboxyalkylcellulose in a purified state from a dough of crude etherification reaction mixture containing a salt of carboxyalkylcellulose, by-product salts, residual reactants, and water, the steps which comprise adjusting the pH of said dough to a value less than about 7; extruding said dough to shaped articles; drying the shaped articles to a moisture content less than about 5% by weight; treating with water, the pH of which has been adjusted to a value less than about 3.0, for a time sufficiently long to render the carboxyalkylcellulose insoluble in water; and thereafter washing with water until free of contaminating salts.

10. In a process for recovering the free acid form of carboxyalkylcellulose in a purified state from a dough of crude etherification reaction mixture containing a salt of carboxyalkylcellulose, by-product salts, residual reactants, and water, the steps which comprise adjusting the pH of said dough to a value less than about 7; reducing said dough to shaped articles, each article having at least one dimension less than about 0.04 inch; drying the shaped articles to a moisture content less than about 5% by weight; treating with water, the pH of which has been adjusted to a value less than about 3.0, for a time sufficiently long to render the carboxyalkylcellulose insoluble in water; and thereafter washing with water until free of contaminating salts.

11. In a process for recovering the free acid form of carboxymethylcellulose in a purified state from a dough of crude etherification reaction mixture containing a salt of carboxymethylcellulose, by-product salts, residual reactants, and water, the steps which comprise adjusting the pH of said dough to a value less than about 7; reducing said dough to shaped articles, each article having at least one dimension less than about 0.04 inch; drying the shaped articles to a moisture content less than about 5% by weight; treating with water, the pH of which has been adjusted by a value less than about 3.0, for a time sufficiently long to render the carboxymethylcellulose insoluble in water; and thereafter washing with water until free of contaminating salts.

12. In a process for recovering the free acid form of carboxyalkylcellulose in a purified state from a dough of crude etherification reaction mixture containing a salt of carboxyalkylcellulose, by-product salts, residual reactants, and water, the steps which comprise adjusting the pH of said dough to a value between about 4 and about 7; reducing said dough to shaped articles, each article having at least one dimension less than about 0.04 inch; drying the shaped articles to a moisture content less than about 3.5% by weight; treating with water, the pH of which has been adjusted to a value between about 1 and about 1.5, for a time sufficiently long to render the carboxyalkylcellulose insoluble in water; and thereafter washing with water until free of contaminating salts.

13. In a process for recovering the free acid form of carboxymethylcellulose in a purified state from a crude etherification reaction mixture containing a salt of carboxymethylcellulose, by-product salts, residual reactants, and water, the steps which comprise adjusting the pH of said reaction mixture to a value between about 4 and about 7; drying to a moisture content less than about 3.5% by weight; treating with water, the pH of which has been adjusted to a value between about 1 and about 1.5, for a time sufficiently long to render the carboxymethylcellulose insoluble in water; and thereafter washing with water until free of contaminating salts.

BAYARD T. LAMBORN.

REFERENCES CITED

The following references are of record in the file of this patent:

UNITED STATES PATENTS

| Number | Name | Date |
|---|---|---|
| 2,178,630 | Finlayson | Nov. 7, 1939 |